United States Patent
Watanabe et al.

(10) Patent No.: US 7,428,574 B2
(45) Date of Patent: Sep. 23, 2008

(54) DEVICE COOPERATION SERVICE SYSTEM AND ELECTRONIC DEVICES INCLUDED IN THE SYSTEM

(75) Inventors: Takahiro Watanabe, Osaka (JP); Takayuki Hamaki, Kyoto (JP); Satoshi Hashimoto, Lawrenceville, NJ (US); Hidetaka Ohto, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/585,321

(22) PCT Filed: Dec. 27, 2004

(86) PCT No.: PCT/JP2004/019539
§ 371 (c)(1),
(2), (4) Date: Apr. 18, 2007

(87) PCT Pub. No.: WO2005/066808
PCT Pub. Date: Jul. 21, 2005

(65) Prior Publication Data
US 2007/0250458 A1    Oct. 25, 2007

(30) Foreign Application Priority Data
Jan. 6, 2004    (JP) ............................. 2004-000948

(51) Int. Cl.
*G06F 15/16* (2006.01)
(52) U.S. Cl. .................. 709/205; 709/204; 709/217; 709/218; 709/219; 709/223; 463/42
(58) Field of Classification Search ............... 709/204, 709/205, 223, 217–219; 463/42
See application file for complete search history.

(56) References Cited

U.S. PATENT DOCUMENTS
5,974,442 A * 10/1999 Adams ....................... 709/200

(Continued)

FOREIGN PATENT DOCUMENTS
JP    2002-057683    2/2002

(Continued)

OTHER PUBLICATIONS
UPnp Forum, "UPnP Device Architecture V1.0.1", [online], May 6, 2003, [retrieved on Jul. 30, 2003], Internet <URL:http://www.upnp.org/download/Clean%20UPnPDA101-20030506.doc>.

(Continued)

*Primary Examiner*—Liangche A Wang
(74) *Attorney, Agent, or Firm*—Wenderoth, Lind & Ponack, L.L.P.

(57) ABSTRACT

Provided is a device cooperation service system which dynamically collects information relating to a device cooperation service and includes a service discovery method for enabling an electronic device to be identified and enabling an application to be downloaded. The system of the present invention has a function of discovering an electronic device which can execute a cooperation service and has a function of specifying a service executable by a combination of an own electronic device and other electronic devices having been discovered. Using these functions, the combination of the electronic devices which can execute the cooperation service is found, and each of the electronic devices is caused to download an application necessary for executing the service.

15 Claims, 17 Drawing Sheets

U.S. PATENT DOCUMENTS

| | | |
|---|---|---|
| 6,195,701 B1 * | 2/2001 | Kaiserswerth et al. ...... 709/231 |
| 6,699,125 B2 * | 3/2004 | Kirmse et al. ................. 463/42 |
| 7,302,488 B2 * | 11/2007 | Mathew et al. .............. 709/229 |
| 2002/0004711 A1 | 1/2002 | Sato et al. |
| 2002/0086732 A1 * | 7/2002 | Kirmse et al. ................. 463/42 |
| 2002/0107583 A1 | 8/2002 | Webser et al. |
| 2002/0188867 A1 | 12/2002 | Bushey et al. |
| 2003/0008713 A1 * | 1/2003 | Ushiro et al. ................. 463/42 |
| 2003/0169728 A1 | 9/2003 | Choi |
| 2003/0233537 A1 * | 12/2003 | Wohlgemuth et al. ....... 713/151 |
| 2003/0236833 A1 * | 12/2003 | Glitho et al. ................. 709/204 |
| 2005/0027382 A1 * | 2/2005 | Kirmse et al. ................. 700/91 |

FOREIGN PATENT DOCUMENTS

| | | |
|---|---|---|
| JP | 2002-232977 | 8/2002 |
| JP | 2003-076632 | 3/2003 |
| JP | 2003-102078 | 4/2003 |
| JP | 2003-345687 | 12/2003 |

OTHER PUBLICATIONS

UPnP Forum, "UPnP AV Architecture V0.83", [online], Jun. 12, 2002, [retrieved on July 30, 2003], Internet <URL:http://www.upnp.org/download/UpnPAvArchitecture%200.83.prtad.pdf>.

* cited by examiner

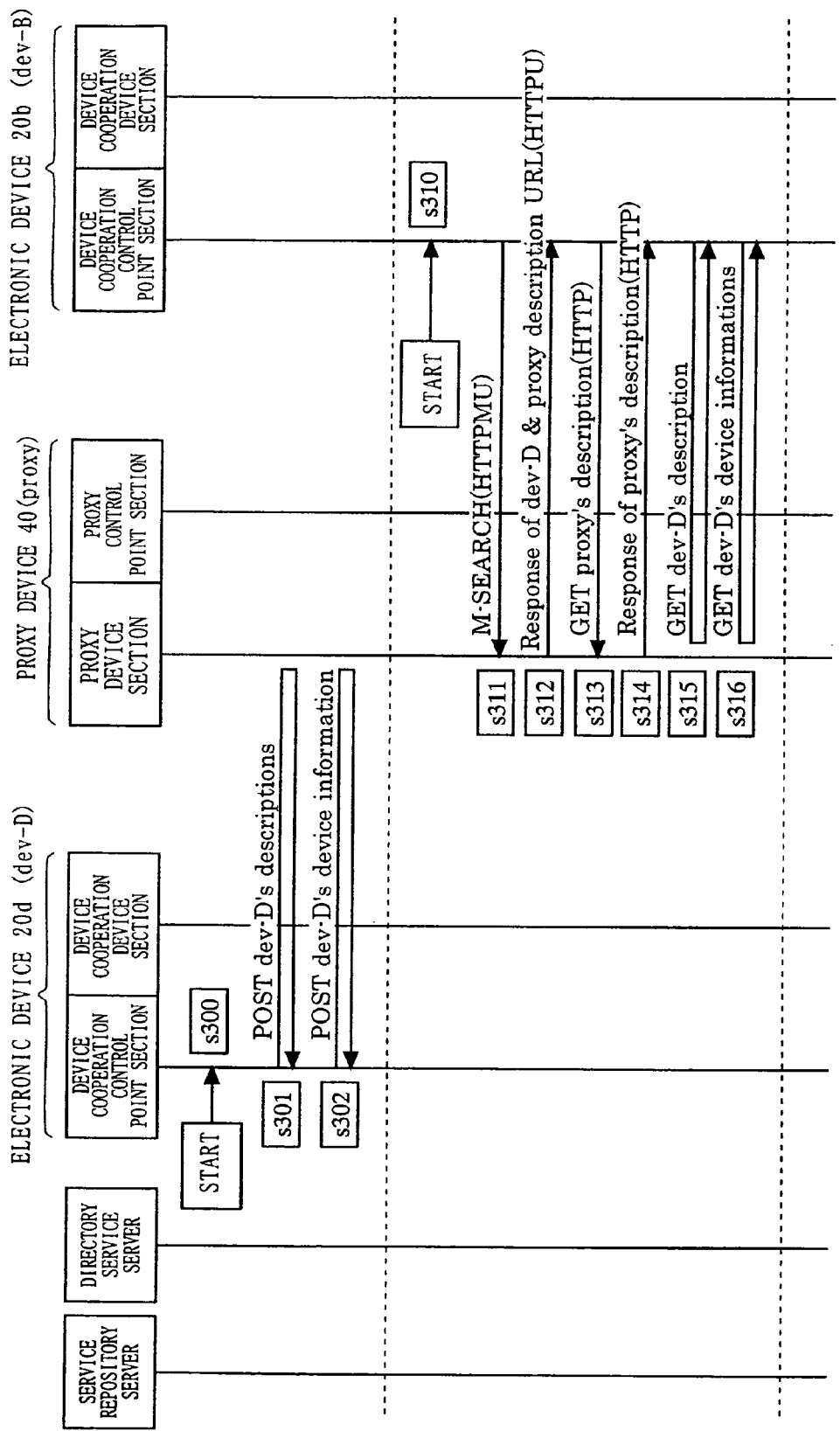
F I G. 17

DEVICE COOPERATION SERVICE SYSTEM AND ELECTRONIC DEVICES INCLUDED IN THE SYSTEM

TECHNICAL FIELD

The present invention relates to a device cooperation service system and electronic devices included in the system, and more particularly to a device cooperation service system for allowing a plurality of electronic devices connected to each other via a network to share information (software and the like) relating to a service and to execute the service in cooperation with each other based on the information, and electronic devices used for the device cooperation service system.

BACKGROUND ART

In recent years, UPnP (Universal Plug and Play) has been becoming predominant as a framework for allowing electronic devices (a digital still camera (DSC), a digital video camera (DVC), a mobile telephone, a digital television (DTV), a home-use server, a set-top box (STB), a Safe-deposit Box, and the like) to cooperate with each other via an in-home network and the like. UPnP realizes service discovery (finding a service) by multicasting, on the LAN (Local Area Network), locations at which information relating to the electronic devices (device) and a service is to be accessed (see Non-Patent Document 1 and Non-Patent Document 2). Further, a service supported by UPnP is realized by executing an application preinstalled in the device.

Non-Patent Document 1: UPnP Forum, "UPnP Device Architecture V1.0.1", [online], May 6, 2003, [retrieved on Jul. 30, 2003], Internet <URL:http://www.upnp.org/download/Clean%20UPnPDA101-20030506.doc>

Non-Patent Document 2: UPnP Forum, "UPnP AV Architecture V0. 83", [online], Jun. 12, 2002, [retrieved on Jul. 30, 2003], Internet <URL:http://www.upnp.org/download/UpnPAvArchitecture%200.83.prtad.pdf>

DISCLOSURE OF THE INVENTION

Problems to be Solved by the Invention

As an example where a typical device cooperation service is realized, a stationary device (DVD recorder and the like) being controlled from a mobile device (mobile telephone and the like) connected to an in-home network is considered. However, purchase cycles of both devices are substantially different from each other, that is, the purchase cycle for the mobile device is about one to two years whereas the purchase cycle for the stationary device is more than five years. Therefore, if the mobile device has its type renewed in this purchase cycle, applications of the stationary device cannot support the device cooperation service in the future.

As a measure against this problem, for example, an application necessary for the device cooperation service to be downloaded from a server on the network as necessary is easily considered. The download of the application being controlled on the network using the aforementioned UPnP technology is considered, and it is necessary to realize, in the UPnP technology, a service discovery process (or a retrieval of an application for realizing the device cooperation service) in which an application having not been downloaded can be supported, so as to discover and identify another device capable of executing the service in cooperation and to discover a relevant application to be downloaded.

Therefore, an object of the present invention is to provide a device cooperation service system having a service discovery method for allowing information relating to the device cooperation service to be dynamically collected, an electronic device to be identified and an application to be downloaded, and electronic devices included in the system.

Solution to the Problems

The present invention is directed to an electronic device for executing an application in cooperation with at least one other electronic device connected to a network and realizing a predetermined device cooperation service, and a device cooperation service system including the electronic device. To achieve the above objects, the electronic device according to the present invention has the following feature depending on whether the electronic device acts as a control electronic device for controlling the device cooperation service or the electronic device acts as an execution electronic device for executing the device cooperation service in cooperation with the control electronic device.

The control electronic device includes: a storage section for storing device information, concerning all other electronic devices connected to the network, which includes at least information used for identifying a device and information of executable device cooperation services; an identification section for identifying the other electronic device which is operable to work in cooperation, based on the device information; a service information acquisition section for acquiring, from a predetermined server connected to the network, service information relating to the device cooperation service executable in cooperation with the other electronic device having been identified; an application acquisition section for specifying, based on the service information, the device cooperation service to be executed, and acquiring, from a predetermined server connected to the network, an application necessary for executing the device cooperation service having been specified; an acquisition requesting section for requesting the other electronic device having been identified to acquire, from the predetermined server, the service information relating to the device cooperation service having been specified; and a start requesting section for requesting the other electronic device having been identified to start the device cooperation service. The start requesting section may further request the other electronic device having been identified to acquire, from the predetermined server, a service application necessary for executing the device cooperation service and execute the service application.

The execution electronic device includes: a service information acquisition section for acquiring, from a predetermined server connected to the network, service information relating to the device cooperation service executable in cooperation with the other electronic device, in response to a request from the other electronic device; an application acquisition section for acquiring, from a predetermined server connected to the network, an application necessary for executing the device cooperation service indicated in the service information; and an execution section for executing the acquired application. In addition thereto, the execution electronic device may includes: a storage section for storing device information, concerning all other electronic devices connected to the network, which includes at least information used for identifying a device and information of executable device cooperation services; and a distribution section for distributing the device information to the other electronic device as necessary.

The information used for identifying a device is typically device type data indicating a device type of an electronic device and the information of the executable device cooperation services is service type data indicating device cooperation services executable by the electronic devices. Further, the service information is information having the device type data associated with storage position data of an application necessary for executing the device cooperation service, and the device type data is data indicating a device type of the electronic device which is operable to execute the device cooperation service.

In this case, the application acquisition section acquires the application necessary for the device cooperation service with reference to the storage position data. Further, the service information acquisition section preferably requests the predetermined server to retrieve, based on the device type data of the device information, the device cooperation service executable in combination of the electronic device provided therewith, thereby acquiring the service information as a retrieval result from the predetermined server. Moreover, the identification section preferably associates, for management, the service information acquired by the service information acquisition section with the device information of the other electronic device corresponding to the device type data having been specified by the service information acquisition section for retrieving the device cooperation service, thereby identifying the other electronic device which executes the device cooperation service. Furthermore, the execution section preferably makes a start in response to an execution request from the other electronic device.

On the other hand, the device cooperation service system for realizing a device cooperation service comprises: at least one control electronic device and at least one execution electronic device described above; a server connected to the network for storing service information relating to the device cooperation service; and a server connected to the network for storing applications necessary for executing the device cooperation services. Further, the device cooperation service system may further include a proxy device for relaying data to be exchanged between an in-home electronic device connected to an in-home network and an out-of-home electronic device connected to an out-of-home network.

The proxy device may acquire, from the out-of-home electronic device (or the in-home electronic device), device attribute information including the device information and distribute the acquired attribute information to the in-home electronic device (or the out-of-home electronic device). The proxy device may distribute the attribute information to the in-home electronic device (or the out-of-home electronic device) using, as a trigger, the acquisition of the attribute information from the out-of-home electronic device (or the in-home electronic device). The proxy device may distribute the attribute information to the in-home electronic device (or the out-of-home electronic device) using, as a trigger, a request of the attribute information received from the in-home electronic device (or the out-of-home electronic device).

The information used for identifying a device is typically device type data indicating a device type of an electronic device, and the proxy device requests the server to retrieve, based on the device type data of the device information of the in-home electronic device and the out-of-home electronic device, the device cooperation service executable in combination of the electronic devices, thereby acquiring the service information as a retrieval result from the server. Alternatively, the information used for identifying a device is device type data indicating a device type of the electronic device, and the proxy device associates, for management, the acquired service information with the device information of the electronic device corresponding to the device type data having been specified for retrieving the device cooperation service, thereby identifying the electronic device which executes the device cooperation service.

Effect of the Invention

According to the present invention, an application of a device cooperation service is downloaded, thereby enabling a function of an electronic device to be updated or enabling the device cooperation service to be discovered. Thereby, information relating to the device cooperation service or the device cooperation service executable between a mobile electronic device and a stationary electronic device, each of which has a different purchase cycle from each other, can be discovered and executed in a scope of a link local address. Further, the present invention can be supported by a UPnP-based connection environment which is currently becoming predominant. Moreover, according to the present invention, although the service control device or the service execution device has no packet receiving function, information relating to a device connected to an in-home network or a service can be collected and discovered by proxy.

BRIEF DESCRIPTION OF THE DRAWINGS

FIG. 17 is a flow chart showing process steps performed by the service control device 20b according to the third embodiment.

Figure 1:
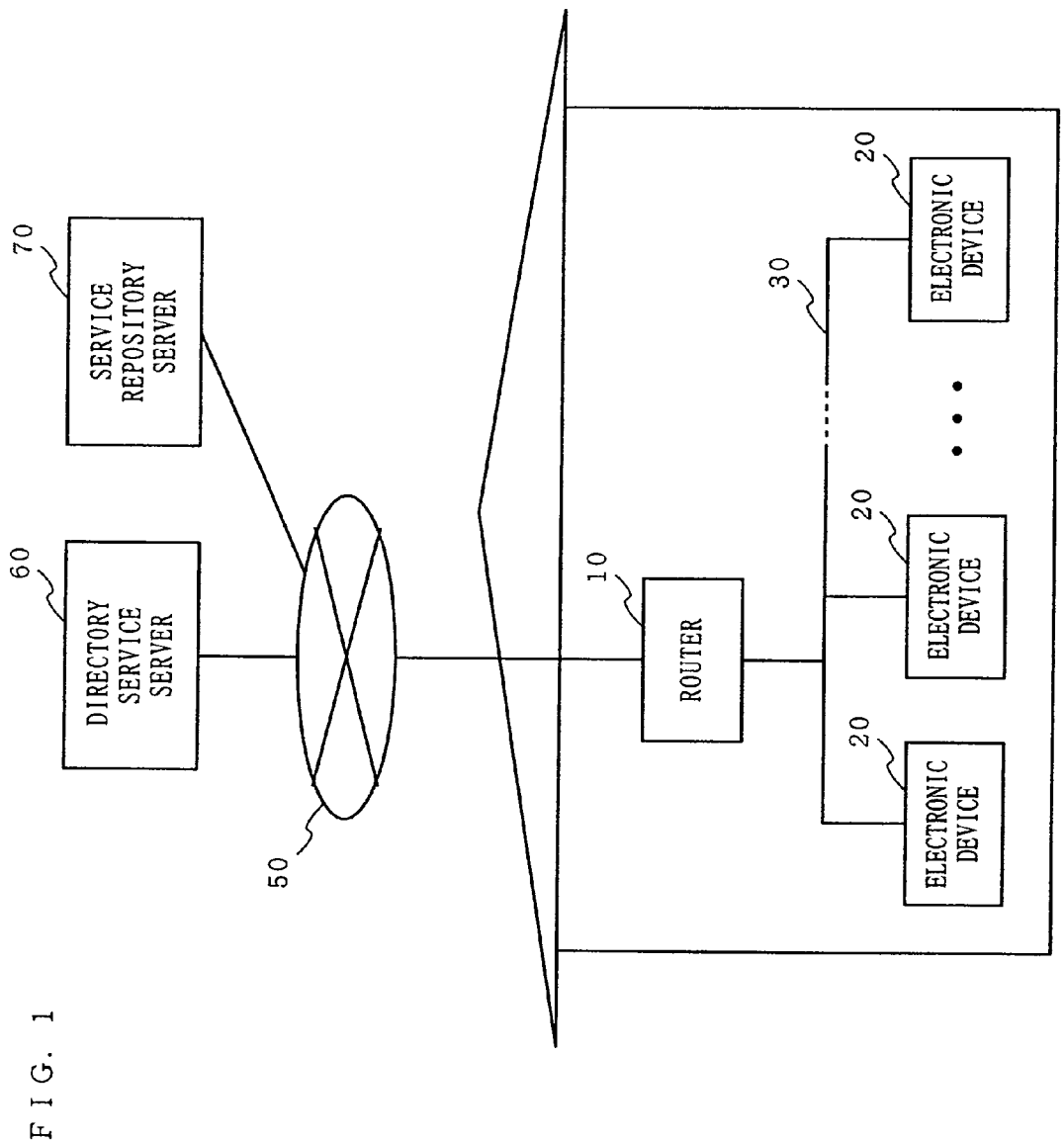
FIG. 1 is a diagram illustrating an exemplary configuration of a device cooperation service system according to a first embodiment of the present invention.

DESCRIPTION OF THE REFERENCE CHARACTERS 10 router
20, 20a, 20b, 20c and 20d electronic device
21 service application section
22 device cooperation device section
23 device cooperation control point section
24 main function execution section
30, 50, 80 network
40 proxy device
41 proxy device section
42 proxy control point section
60 directory service server
70 service repository server
221, 231 device cooperation device information storage section
222 device cooperation device information distribution section
223, 233 device cooperation service information acquisition section
224 application acquisition section
225 application execution section
232 device identification section
234 device cooperation service information acquisition requesting section
235 device cooperation service start requesting section

BEST MODE FOR CARRYING OUT THE INVENTION

First Embodiment

FIG. 1 is a diagram illustrating an exemplary configuration of a device cooperation service system according to a first embodiment of the present invention. The device cooperation service system shown in FIG. 1 is configured such that a router 10 and a plurality of electronic devices 20, which are in a home, are connected via a network 50 to a directory service server 60 and a service repository server 70, which are outside the home. The router 10 and the plurality of electronic devices 20 are connected to each other via an in-home network 30 such as a LAN, and each of the electronic devices 20 can access the out-of-home network 50 via the router 10. The directory service server 60 is a server for providing information relating to the device cooperation service via the network 50. The service repository server 70 is a server for providing an application which is necessary for executing the device cooperation service and is to be downloaded via the network 50.

Figure 2:
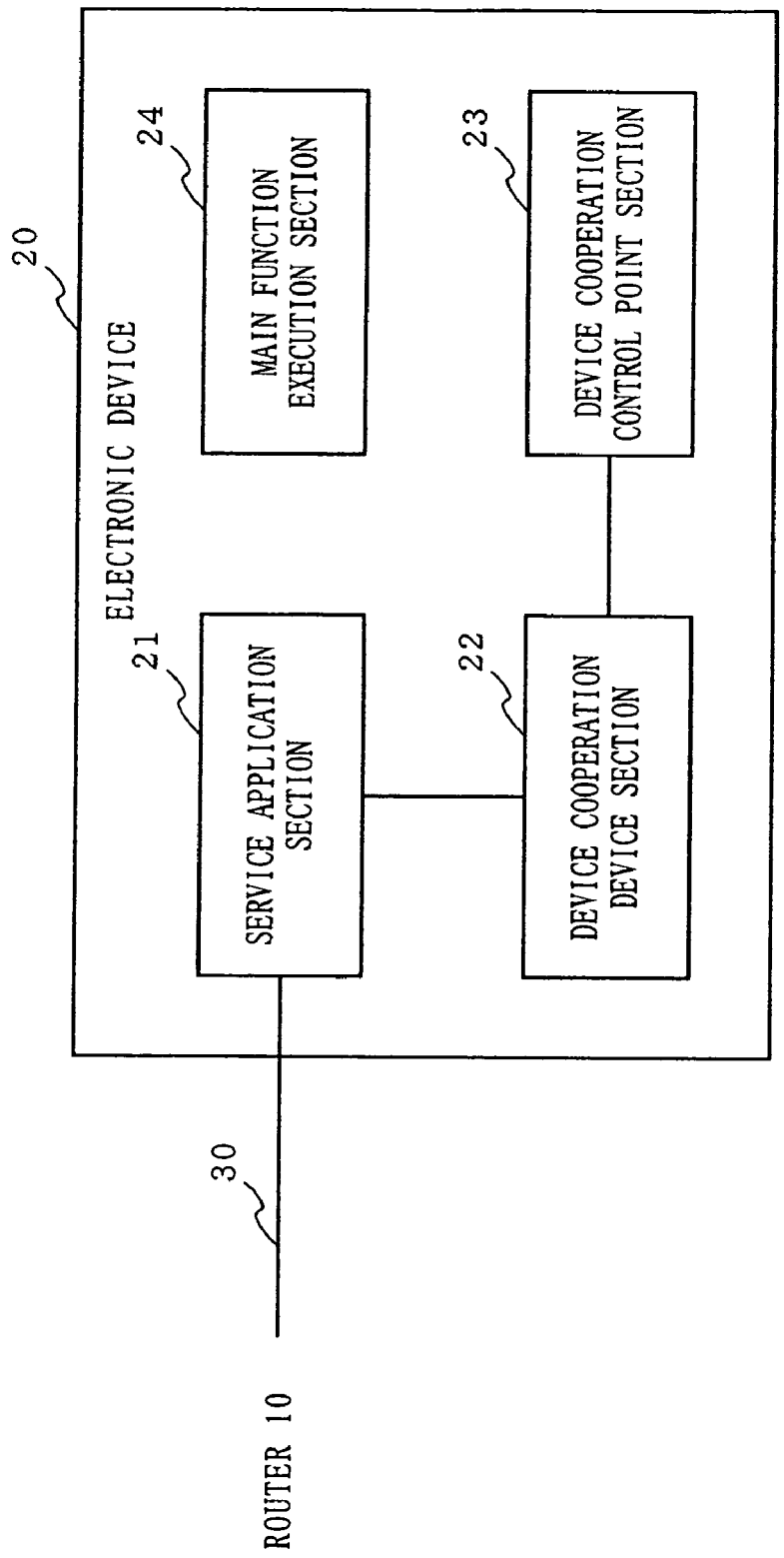
FIG. 2 is a diagram illustrating in detail an exemplary configuration of an electronic device 20.
Figure 3:
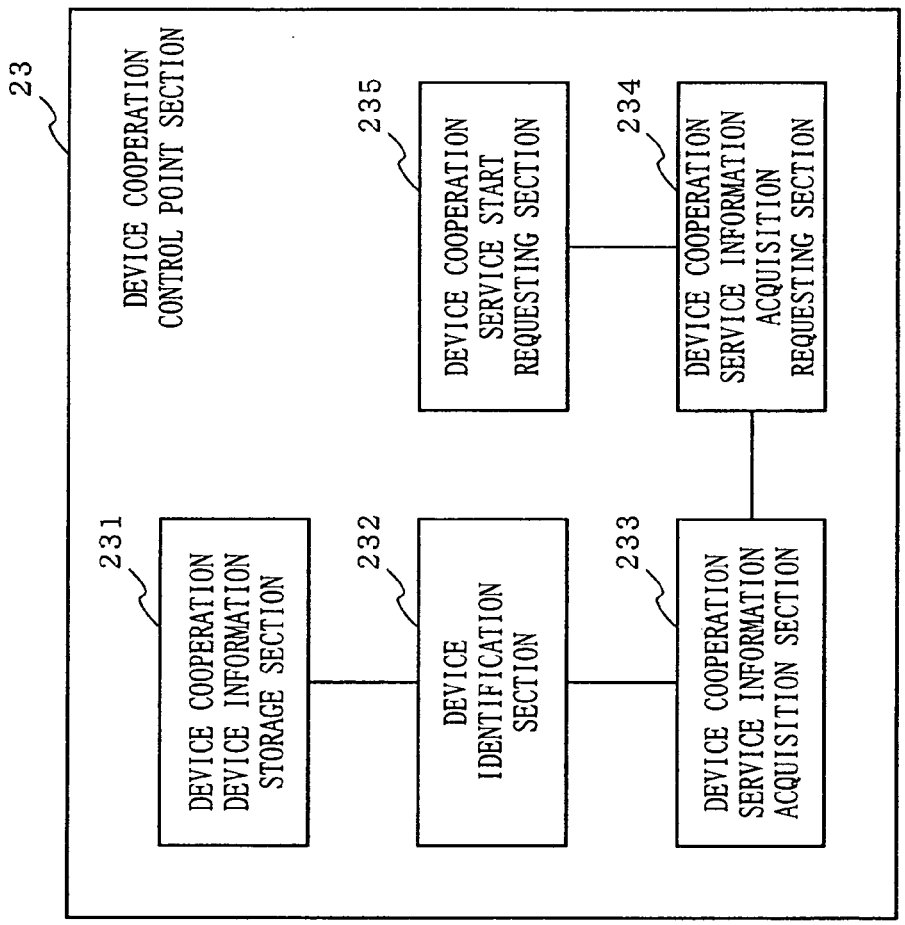
FIG. 3 is a diagram specifically illustrating an exemplary configuration of a device cooperation control point section 23.
Figure 4:
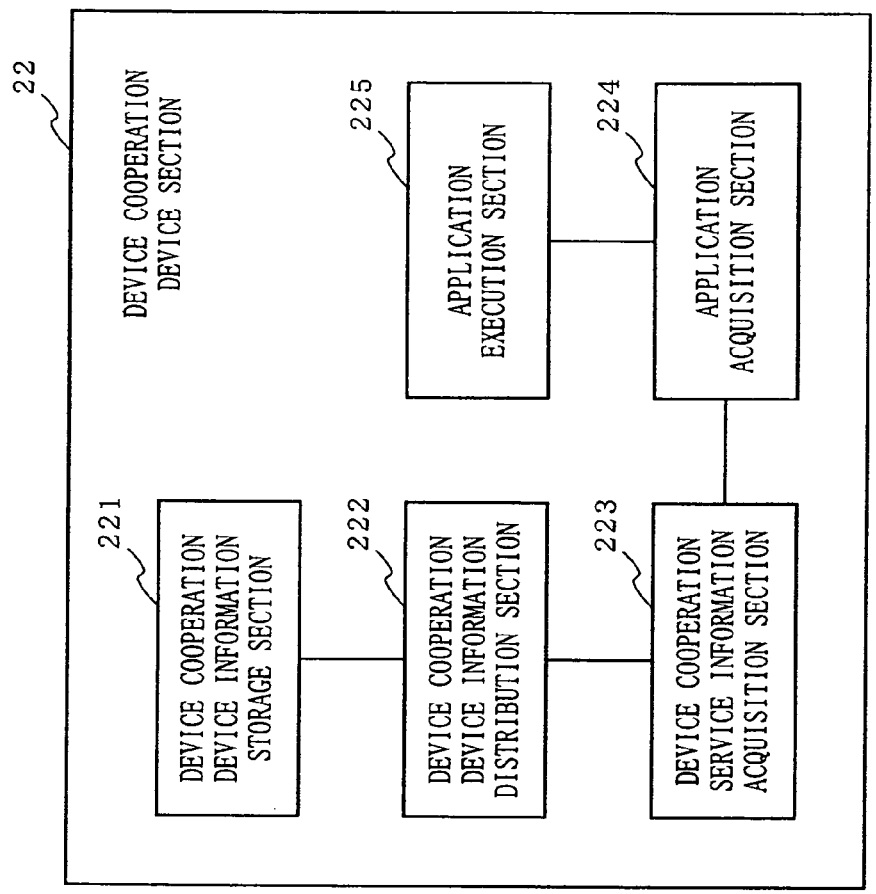
FIG. 4 is a diagram specifically illustrating an exemplary configuration of a device cooperation device section 22.

Before a device cooperation service operation performed by the device cooperation service system according to the first embodiment is described, outlines of the respective components will be further described with reference to FIGS. 2 to 4. FIG. 2 is a diagram illustrating in detail a configuration of the electronic device 20. FIG. 3 is a diagram specifically illustrating an exemplary configuration of a device cooperation control point section 23 shown in FIG. 2. FIG. 4 is a diagram specifically illustrating an exemplary configuration of a device cooperation device section 22 shown in FIG. 2. In the following description, an electronic device requesting a device cooperation service is referred to as "a service control device" and an electronic device requested to perform the device cooperation service by the service control device is referred to as "a service execution device".

As shown in FIG. 2, the electronic device 20 includes a service application section 21, a device cooperation device section 22, a device cooperation control point section 23, and a main function execution section 24. The service application section 21 has a storage medium such as a memory and a hard disk (HD) for storing an application relating to a device cooperation service (which may include a configuration file for determining an interface among pieces of hardware included in the electronic device 20). The device cooperation device section 22 receives information relating to the device cooperation service from the service control device, and executes the device cooperation service. The device cooperation control point section 23 supplies, when the electronic device provided therewith acts as the service control device, information of the device cooperation service to the service execution device. Accordingly, when the electronic device acts as only the service execution device, the device cooperation control point section 23 is not necessary. The main function execution section 24 is a section for executing a main function of the electronic device 20. For example, when the electronic device 20 is a TV, the main function execution section 24 corresponds to a section for executing a function of receiving a video and the like, and when the electronic device 20 is a VTR, the main function execution section 24 corresponds to a section for executing a recording and reproducing functions, and the like.

As shown in FIG. 3, the device cooperation control point section 23 includes a device cooperation device information storage section 231, a device identification section 232, a device cooperation service information acquisition section 233, a device cooperation service information acquisition requesting section 234, and a device cooperation service start requesting section 235. The device cooperation device information storage section 231 detects and stores device cooperation device information as attribute information relating to another electronic device. The device identification section 232 identifies another electronic device, i.e., the service execution device, for executing the device cooperation service. The device cooperation service information acquisition section 233 acquires, from the directory service server 60, device cooperation service information relating to the device cooperation service to be executed between the service control device and the service execution device having been identified. The device cooperation service information acquisition requesting section 234 requests the service execution device having been identified to acquire the device cooperation service information. The device cooperation service start requesting section 235 requests the service execution device having been identified to start the device cooperation service.

As shown in FIG. 4, the device cooperation device section 22 includes a device cooperation device information storage section 221, a device cooperation device information distribution section 222, a device cooperation service information acquisition section 223, an application acquisition section 224, and an application execution section 225. The device cooperation device information storage section 221 detects for and stores the device cooperation device information. The device cooperation device information distribution section 222 distributes the device cooperation device information to a specific electronic device as necessary. The device cooperation service information acquisition section 223 acquires the device cooperation service information from the directory service server 60. The application acquisition section 224 acquires a necessary application from the service repository server 70 for distributing the application. The application execution section 225 executes the application of the device cooperation service acquired by the application acquisition section 224.

The device cooperation device information storage section 231 of the device cooperation control point section 23 and the device cooperation device information storage section 221 of the device cooperation device section 22, which realize the same function, can be integrated into one component. Further, the device cooperation service information acquisition section 233 of the device cooperation control point section 23 and the device cooperation service information acquisition section 223 of the device cooperation device section 22, which realize the same function, can be also integrated into one component.

Figure 5:
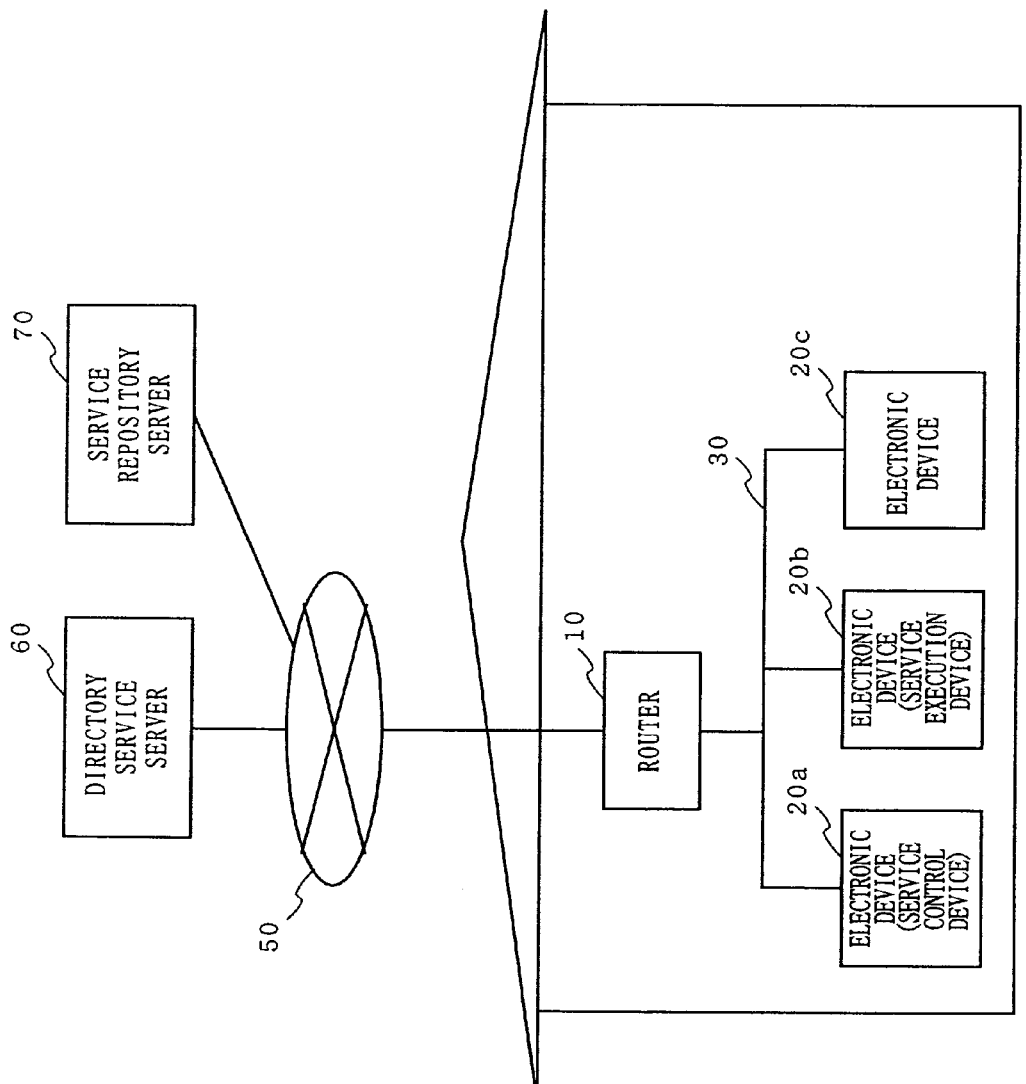
FIG. 5 is a diagram specifically illustrating an exemplary configuration of the device cooperation service system according to the first embodiment of the present invention.

Next, with reference to FIGS. 5 to 9, a device cooperation service operation performed by the device cooperation service system according to the first embodiment of the present invention will be described. In the following example, as shown in FIG. 5, described is a case where three electronic devices 20a, 20b and 20c are connected to the network 30, the electronic device 20a acts as the service control device, and the electronic device 20b acts as the service execution device, thereby executing the device cooperation service. Each of the electronic devices 20a, 20b, and 20c is a device capable of executing the device cooperation service.

Figure 6:
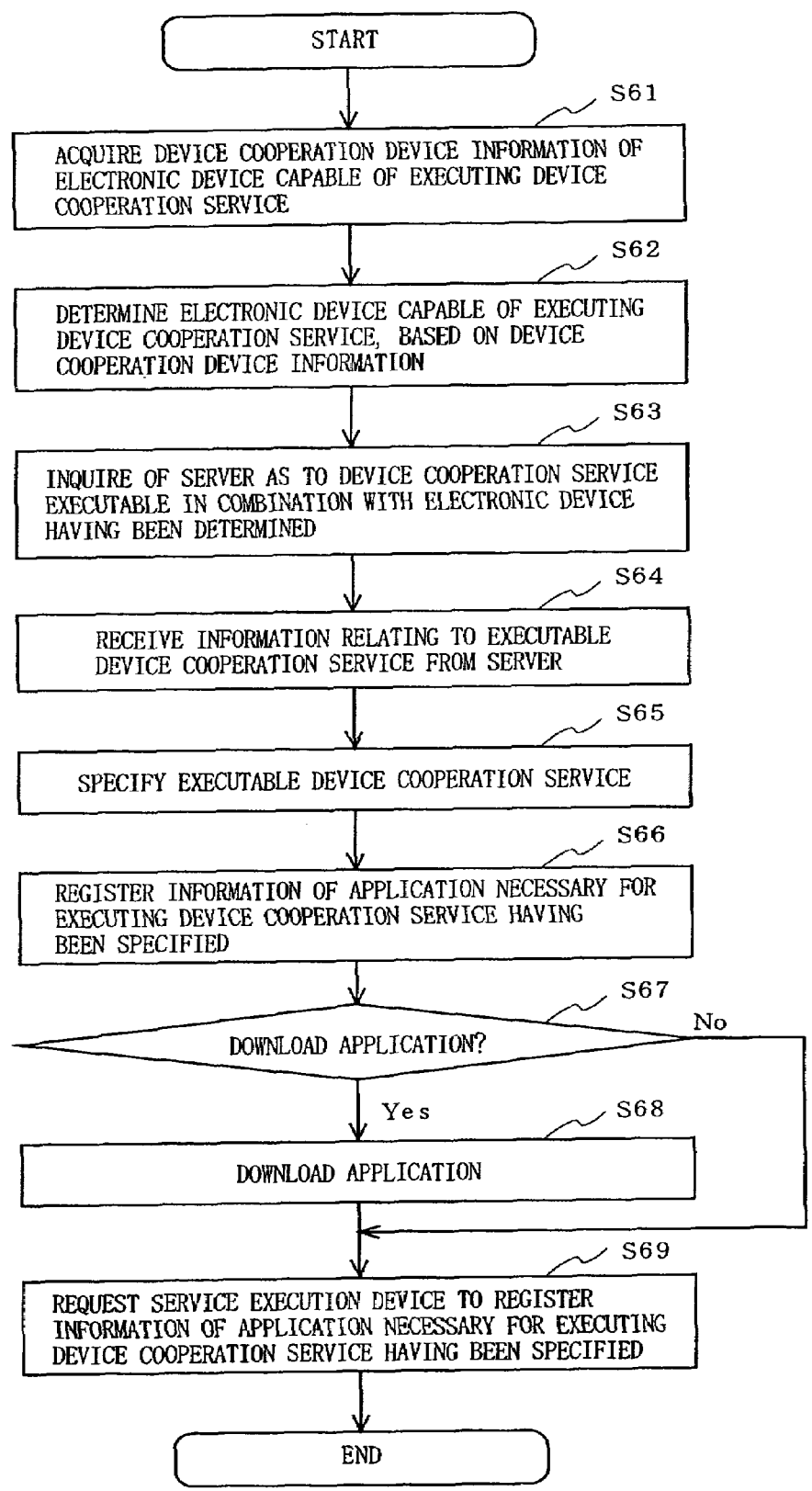
FIG. 6 is a flow chart showing process steps performed by the service control device 20a according to the first embodiment.

Initially, with reference to FIG. 6, a process executed by the service control device 20a will be described. FIG. 6 is a flow chart illustrating process steps performed by the electronic device 20 acting as the service control device. The process shown in FIG. 6 is started by a user or the like instructing the service control device 20a to execute a certain device cooperation service. In response to the instruction, the service control device 20a acquires the device cooperation device information of all the electronic devices capable of executing the device cooperation service, with reference to the device cooperation device information stored in the other electronic devices 20b and 20c connected to the network 30 (step S61).

Figures 7, 8:
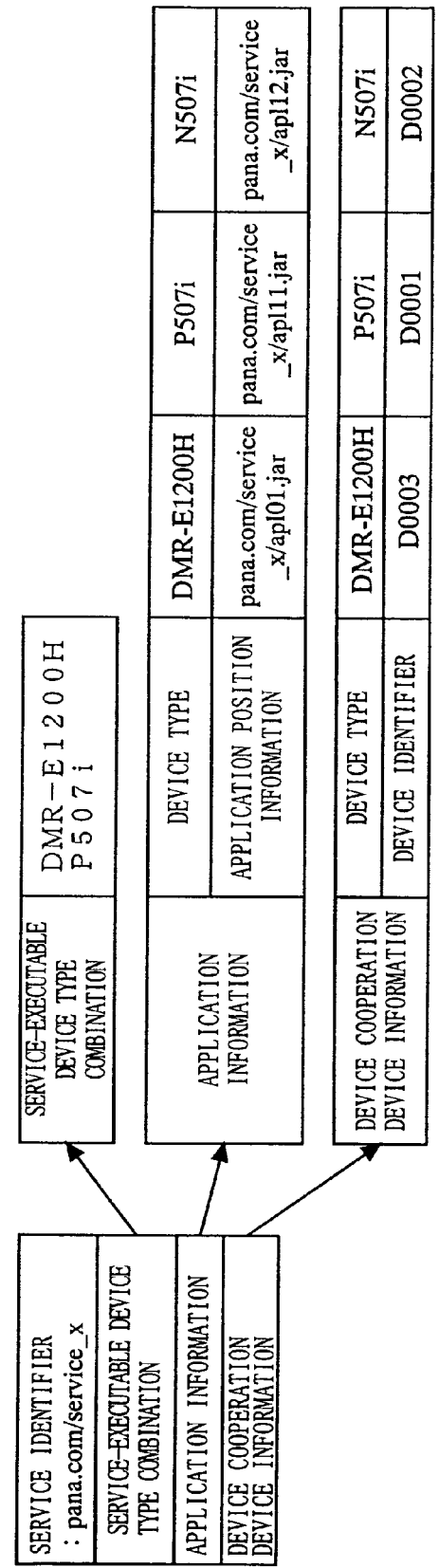
FIG. 7 is a diagram illustrating an example of device cooperation device information which is previously stored in each of the electronic devices 20.
FIG. 8 is a diagram illustrating an example of device cooperation service information.

FIG. 7 is a diagram illustrating an example of the device cooperation device information which is previously stored in each of the electronic devices 20. The device cooperation device information shown in FIG. 7 includes: a device identifier ("D0001" in this example) used for uniquely identifying the electronic device; a device type of the electronic device ("P507i" in this example); a position ("1080:0:0:0:8:800: 200C:417A" in this example) indicating a destination location of transmission to the electronic device; and device cooperation service information ("pana.com/service_x", in this example, indicating a location at which the information is stored) indicating the device cooperation service executable by the electronic device 20. As the device identifier, an identifier unique in a local area may be used or an identifier unique in a global area, for example, a UUID (Universal Unique IDentifier) of device description, may be used.

When the service control device 20a acquires the device cooperation device information from the electronic devices 20b and 20c, the service control device 20a determines the electronic device 20 capable of executing the device service in cooperation therewith (step S62). The determination may be performed by, for example, checking whether or not the electronic device 20 can execute the cooperation service with reference to the device cooperation service information in the device cooperation device information. The service control device 20a inquires of the directory service server 60 what device cooperation service is executable in combination with the electronic device having been determined (step S63). In this example, the service control device 20a inquires about two combinations, that is, a combination of the service control device 20a and the electronic device 20b, and a combination of the service control device 20a and the electronic device 20c.

The directory service server 60 extracts, in response to the inquiry from the service control device 20a, information of an executable application for each combination, and sends the information as the device cooperation service information to the service control device 20a. FIG. 8 is a diagram illustrating an example of the device cooperation service information. As shown in FIG. 8, an identifier for uniquely identifying the executable device cooperation service is described as a service identifier. For example, the service identifier is represented as a URI of a global scope. A combination of device types capable of executing the device cooperation service is described as a service-executable device type combination. Storage location information indicating a location in which an application to be downloaded is stored is described for each device type as application information. As device cooperation device information, the device type and the device identifier are described as information associated with the electronic device used for the device cooperation service.

The service control device 20a receives the device cooperation service information from the directory service server 60 as the response (step S64). The service control device 20a specifies a device cooperation service to be executed among a plurality of device cooperation services having been received (step S65). The specification is performed by a user's selection. In this example, the device cooperation service executed between the service control device 20a and the electronic device 20b is specified. When the device cooperation service to be executed is specified, the service control device 20a registers therein information relating to an application necessary for executing the device cooperation service having been specified (step S66). The service control device 20a downloads the necessary application from the service repository server 70 based on the registered information (steps S67 and S68). Further, the service control device 20a requests the service execution device 20b to register the information relating to the application necessary for executing the device cooperation service having been specified (step S68). The application may not be necessarily downloaded at a time of step S68. The application may be downloaded at any time before the device cooperation service is actually executed. When the application was previously downloaded, the download is unnecessary.

Figure 9:
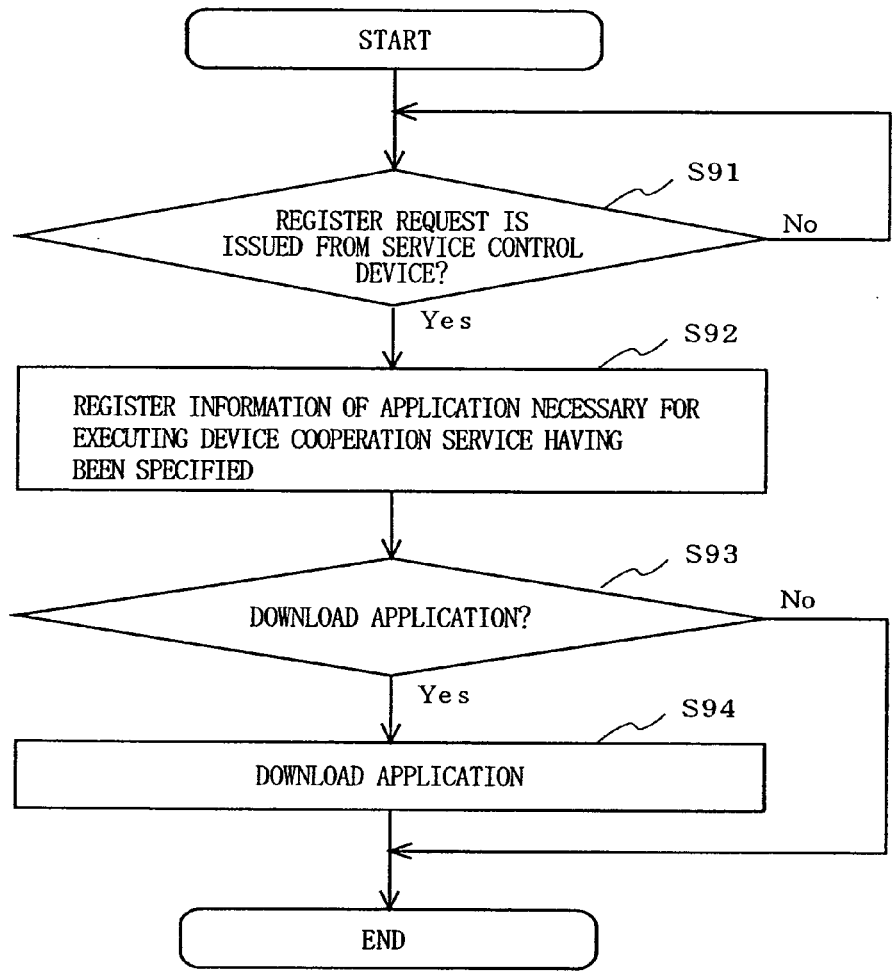
FIG. 9 is a flow chart showing process steps performed by the service execution device 20b according to the first embodiment.

Next, with reference to FIG. 9, a process executed by the service execution device 20b will be described. FIG. 9 is a flow chart illustrating process steps performed by the electronic device 20 acting as the service execution device.

The service execution device 20b registers, in response to the register request received from the service control device 20a, the information relating to the application necessary for executing the device cooperation service having been specified (steps S91 and S92). The service execution device 20b downloads the necessary application from the service repository server 70 based on the registered information (steps S93 and S94). When the application was previously downloaded, the download is unnecessary.

Through the aforementioned processes, both the service control device 20a and the service execution device 20b acquire the application necessary for executing the device cooperation service. After the application is acquired, the device cooperation device sections 22 of the service control device 20a and the service execution device 20b execute the application by using as a trigger a start request of the device cooperation service received from a user, and the like. A network communication is performed between the service applications, and a connection is established, thereby starting the device cooperation service desired by the user.

Figure 10:
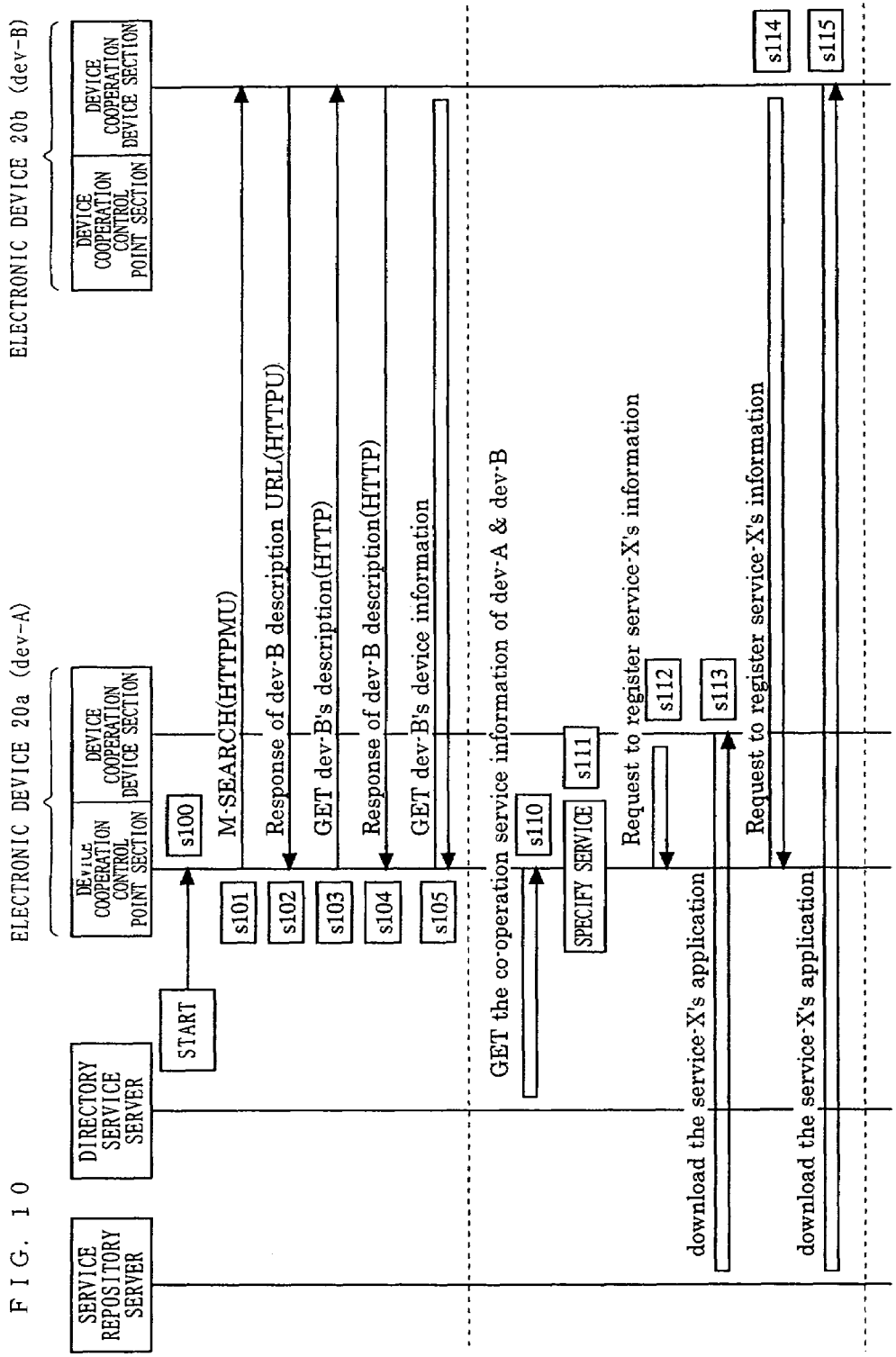
FIG. 10 is a sequence diagram illustrating a process performed until an application is downloaded to the electronic device 20.
Figure 11:
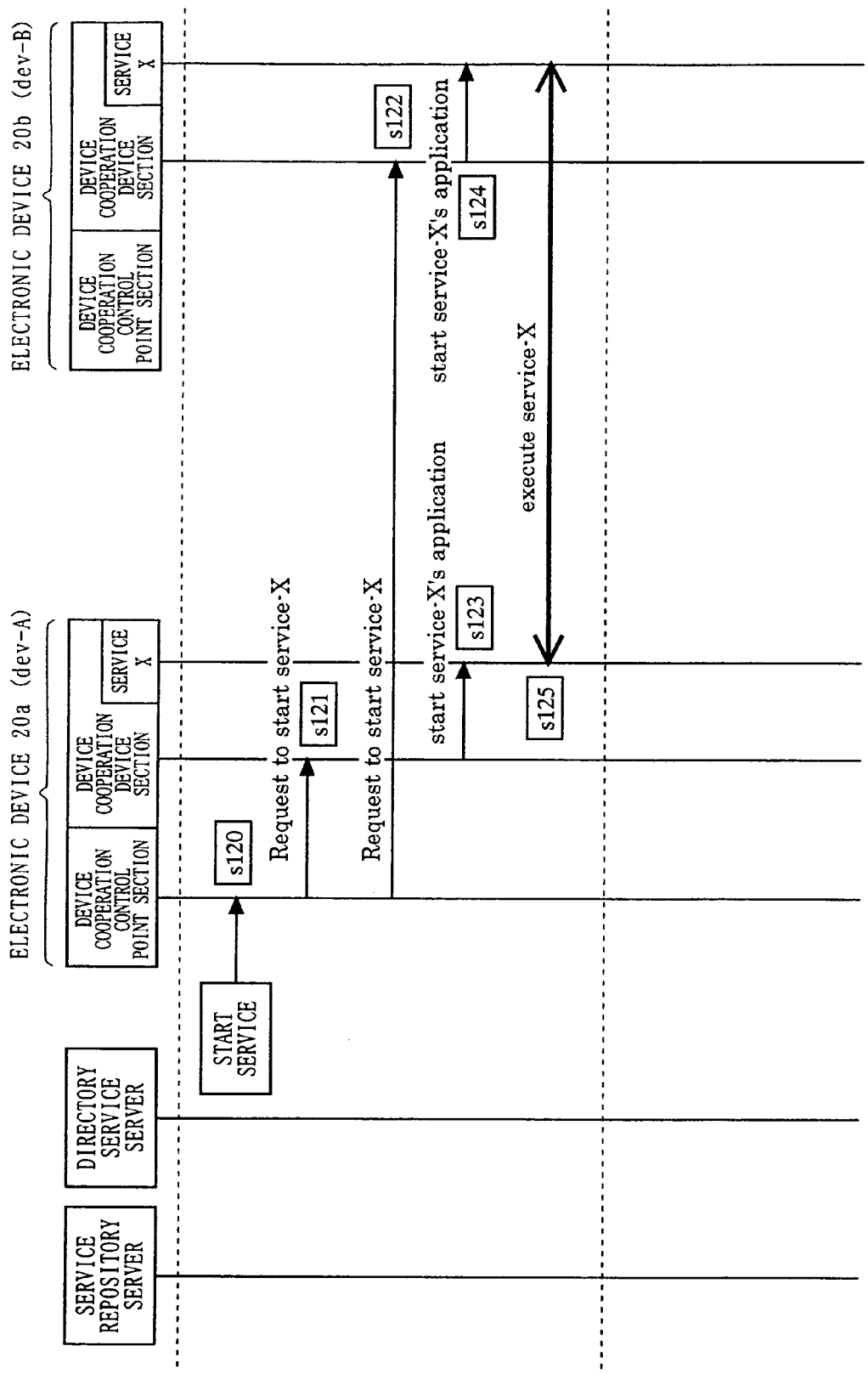
FIG. 11 is a sequence diagram illustrating a process performed by the electronic device after the application has been downloaded.

An example where the aforementioned processes are applied to a system supported by UPnP network will be described. FIG. 10 is a sequence diagram illustrating a process performed until an application is downloaded to the service control device 20a (dev-A) and the service execution device 20b (dev-B). FIG. 11 is a sequence diagram illustrating a process performed by the service control device 20a and the service execution device 20b after the application has been downloaded.

As shown in FIG. 10, initially, the device cooperation control point section 23 of the service control device 20a is actuated by a user's instruction or a predetermined start instruction in the service control device 20a (sequence s100). When the device cooperation control point section 23 is actuated, a protocol communication relating to a DHCP (Dynamic Host Configuration Protocol: protocol for dynamically assigning an IP address to each client at the start-up, and canceling the IP address at the end) is performed between a DHCP server (not shown) connected to the network 30 and the device cooperation control point section 23, and thereafter a predetermined IP address is assigned to the service control device 20a. Alternatively, addressing process is performed by using the Auto-IP function so as to dynamically assign the IP address to the service control device 20a (not shown). When the IP address is assigned using the Auto-IP function, the DHCP server is unnecessary.

Next, a discovery (finding an electronic device having hardware necessary for executing a service) process is to be performed. The device cooperation control point section 23 of the service control device 20a sends, to each of the electronic devices 20 connected to the router 10 via the network 30, an instruction for checking whether or not each of the electronic devices 20 is an electronic device necessary for the user. This instruction can be realized by, for example, multicasting an SSDP (Simple Service Discovery Protocol) M-SEARCH message to 239.255.255.250:1900 (sequence s101).

The device cooperation device section 22 of the electronic device 20b, which is connected to the network 30 and received the message, sends to the service control device 20a positional information indicating a location at which the description information (description) relating to the hardware thereof, a function, performance and setting condition of the hardware, and the like are stored (sequence s102). Specifically, a path to the description is set in a LOCATION header so as to unicast, to the service control device 20a, a response to the SSDP.

The service control device 20a accesses the description information based on the positional information sent from the electronic device 20b, thereby acquiring the information relating to the hardware of the electronic device 20b, the function, performance and setting condition of the hardware, and the like. Specifically, the service control device 20a acquires the description from the electronic device 20b in the HTTP GET method based on the information of the LOCATION header (sequences s103 and s104).

Further, the device cooperation control point section 23 of the service control device 20a requests the device cooperation device information using the information acquired from the electronic device 20b. Specifically, the service control device 20a accesses a location (for example, control URL) in the electronic device 20b at which stored is the device control information required for executing the device cooperation service described in the device description contained in the description, and requests the device cooperation device information of the electronic device 20b, thereby acquiring, from the electronic device 20b, the device cooperation device information having described information which relates to the device and is necessary for retrieving and executing the device cooperation service (sequence s105).

Next, when the device cooperation device information of the electronic device 20b is acquired, the device cooperation control point section 23 of the service control device 20a requests, from the directory service server 60, information relating to the device cooperation service which can be executed when the device type of the service control device 20a and the device type of the electronic device 20b are used in combination with each other, and the directory service server 60 sends to the service control device 20a the information relating to all the relevant device cooperation services (sequence s110). The process of making the request from the directory service server 60 may be collectively performed by another electronic device 20 always working, instead of the service control device 20a having directly received the instruction and the like from the user.

Next, the device cooperation control point section 23 of the service control device 20a specifies the device cooperation service X to be executed and the service execution device 20b, based on the acquired device cooperation service information relating to the device cooperation service and the device cooperation device information of the electronic device 20 capable of executing the device cooperation service (sequence s111). The service control device 20a requests the device cooperation device section 22 thereof to register the device cooperation service information having been acquired (sequence s112). The device cooperation device section 22 having received the request accesses the service repository server 70, and downloads an application relating to the device cooperation service X (sequence s113).

On the other hand, the service control device 20a requests the device cooperation device section 22 of the service execution device 20b to register the same device cooperation service information as acquired by the service control device 20a (sequence s114). The device cooperation device section 22 of the service execution device 20b having received the request accesses the service repository server 70 and downloads the application relating to the device cooperation service X (sequence s115).

Thus, when the application was previously downloaded, the download process is unnecessary for actually executing the service, which is advantageous in that the process can be quickly started. Further, the processes of sequences s113 to s115 may be executed when the device cooperation service X is actually executed. Thereby, only when the service application relating to the device cooperation service is requested, the download is performed, whereby resource can be prevented from being wasted in the case of no service being utilized.

As shown in FIG. 11, when the user using the service control device 20a requests the device cooperation service to be started, the device cooperation control point section 23 of the service control device 20a requests the device cooperation device sections 22 of the service control device 20a and the service execution device 20b to execute the device cooperation service X (sequences s121 and s122).

In response to the request, the device cooperation device sections 22 of the service control device 20a and the service execution device 20b execute the application of the device cooperation service X having been downloaded (sequences s123 and s124). Further, when the application relating to the device cooperation service has not been downloaded in sequences s113 and s115, the application relating to the device cooperation service is downloaded on receipt of the requests made in the sequences s121 and s122, and thereafter the service may be executed.

As described above, the device cooperation service system according to the first embodiment of the present invention allows a user to easily find a combination of the electronic devices necessary for executing the device cooperation service, and to cause each of the plurality of the electronic devices to download the most relevant application. Thereby, the cooperation service executed among the plurality of the electronic devices can be easily realized.

In the first embodiment, the service control device 20a requests to acquire the device cooperation device information of all the electronic devices 20 connected to the network 30 by the multicasting. However, when the electronic device 20b is previously known as the service execution device, only the device cooperation device information of the electronic device 20b is requested to be acquired by unicasting. Further, a system in which the respective electronic devices 20 connected to the network 30 periodically exchange the device cooperation device information with each other does not require the device cooperation device information acquisition process performed when the user makes the instruction.

Moreover, in the first embodiment, the electronic device 20 directly communicates with the directory service server 60 and the service repository server 70. However, the present invention is not restricted thereto. For example, a proxy device (not shown) may relay the communication between the electronic device 20 and the directory service server 60, and the communication between the electronic device 20 and the service repository server 70. In this configuration, only the proxy device may have the function of accessing the network 50, whereby the in-home electronic device 20 can be easily configured. Further, the proxy device may have a fire wall built therein, and the like, so as to enhance security.

Second Embodiment

In the first embodiment, described is a case where the device cooperation service is executed among the plurality of electronic devices 20 connected to the in-home network 30. Next, in the second embodiment, described is a method in which the device cooperation service is executed between the electronic device 20 connected to the out-of-home network 50 and the electronic device 20 connected to the in-home network 30.

Figure 12:
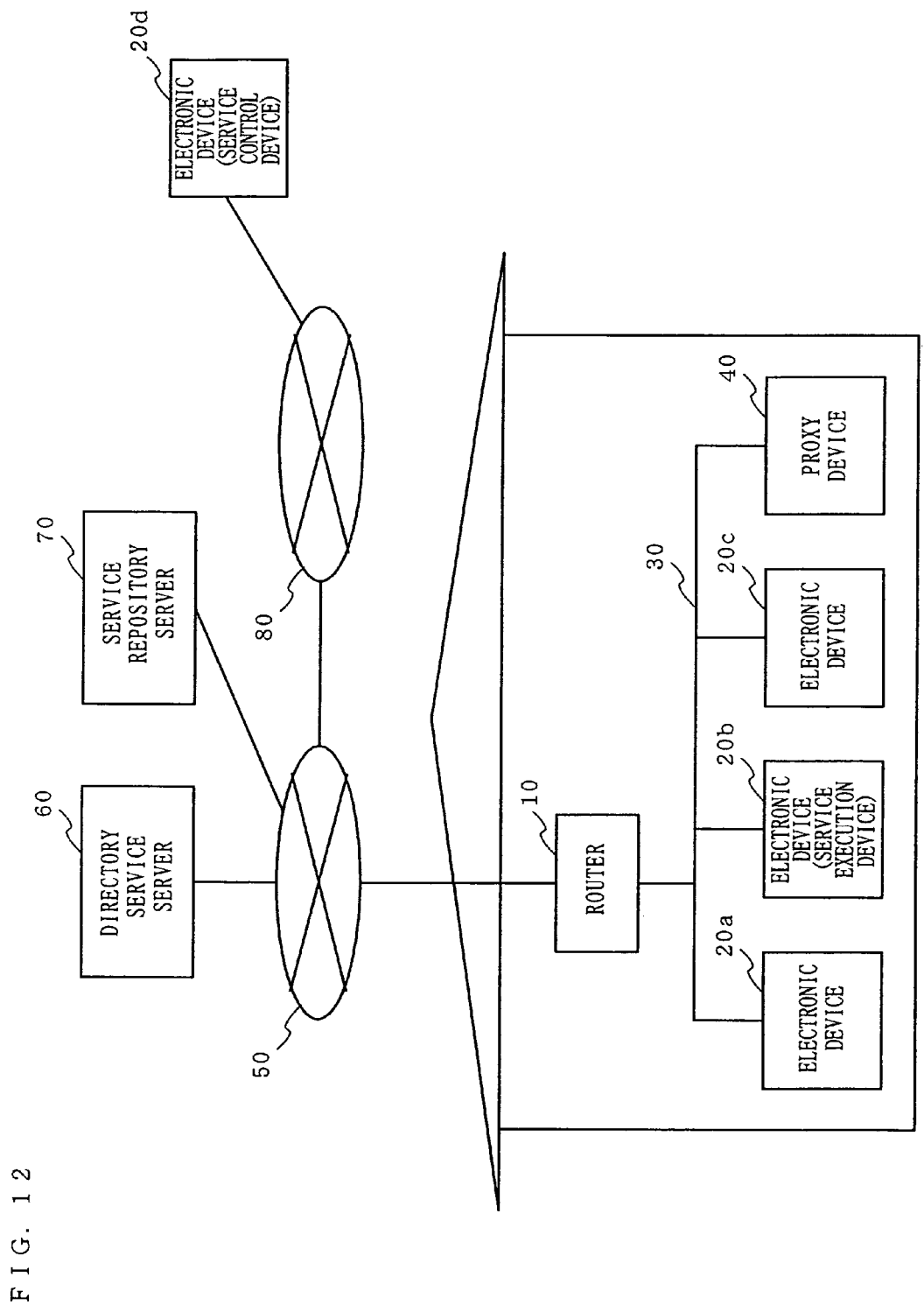
FIG. 12 is a diagram specifically illustrating an exemplary configuration of a device cooperation service system according to a second embodiment of the present invention.

FIG. 12 is a diagram illustrating an exemplary configuration of a device cooperation service system according to the second embodiment of the present invention. The device cooperation service system shown in FIG. 12 is configured such that the router 10, a proxy device 40, and the plurality of electronic devices 20 (the electronic devices 20a, 20b and 20c in the shown example), which are in a home, are connected via the network 50 to the electronic device 20 (the electronic device 20d in the shown example), the directory service server 60 and the service repository server 70, which are outside the home. FIG. 12 shows an example where the electronic device 20d is connected to the network 50 via a network 80. However, the electronic device 20d may be directly connected to the network 50. The plurality of electronic devices 20a, 20b and 20c can access the out-of-home network 50 via the proxy device 40 and the router 10. The directory service server 60 is a server for providing information relating to the device cooperation service via the network 50. The service repository server 70 is a server for providing an application which is necessary for executing the device cooperation service and is to be downloaded via the network 50.

As shown in FIG. 12, the device cooperation service system according to the second embodiment additionally includes the proxy device 40 so as to execute the device cooperation service between the electronic device 20d connected to the out-of-home network 50 and the electronic device 20a connected to the in-home network 30. The components of the device cooperation service system according to the second embodiment which are the same as those of the device cooperation service system according to the first embodiment are denoted by the same reference numerals and the description thereof is not given.

Figure 13:
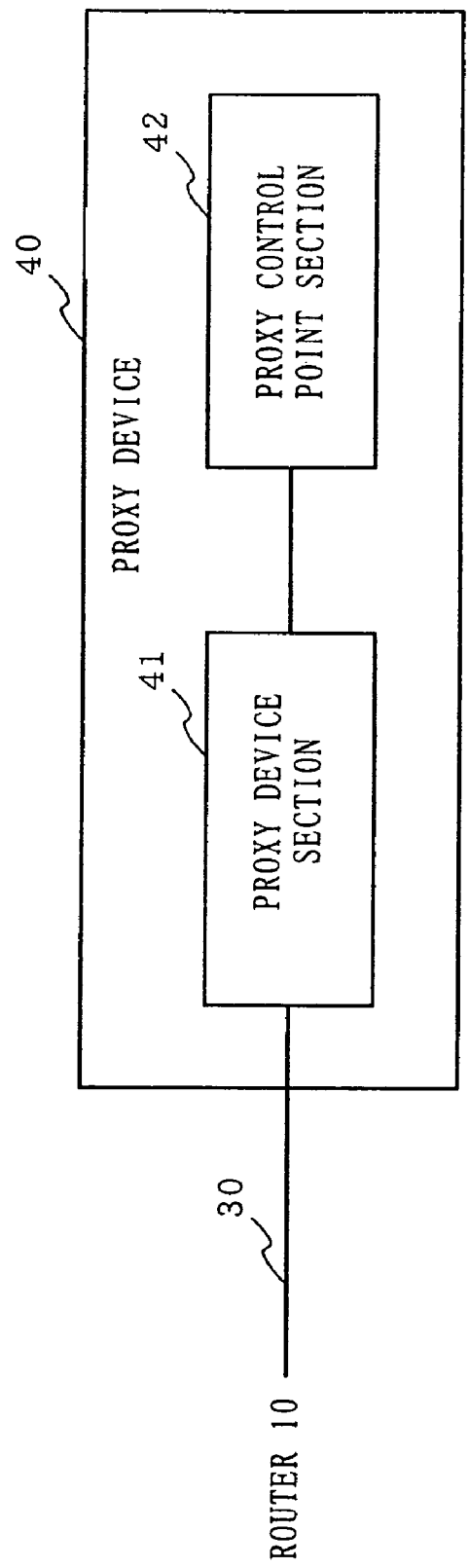
FIG. 13 is a diagram specifically illustrating an exemplary configuration of a proxy device 40.

Only one the proxy device 40 is connected to the UPnP-based network 30. The proxy device 40 includes a proxy device section 41 and a proxy control point section 42 as shown in, for example, FIG. 13. Here, the proxy control point section 42 has a function of controlling the device cooperation device section 22 of the electronic device 20 which can be recognized as being connected to the network 30. Further, the proxy device section 41 has the same function as the device cooperation device section 22 of the electronic device 20, and has a protocol transfer function and a protocol proxy response function such as the discovery process supported by UPnP, acquisition of description, control, eventing, presentation and the like between the in-home electronic device and the out-of-home electronic device.

Figure 14:
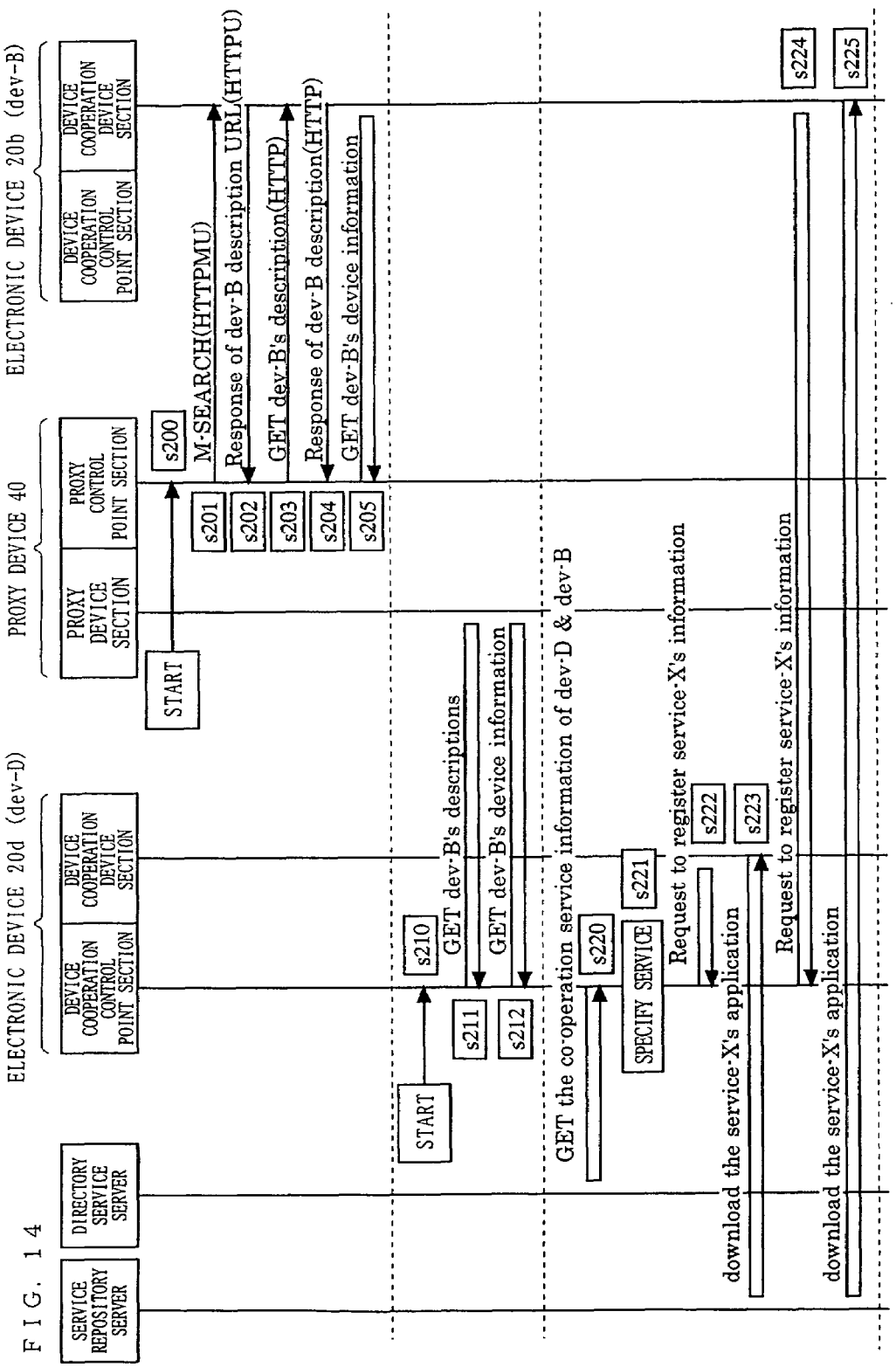
FIG. 14 is a flowchart showing process steps performed by the service control device 20d according to the second embodiment.
Figure 15:
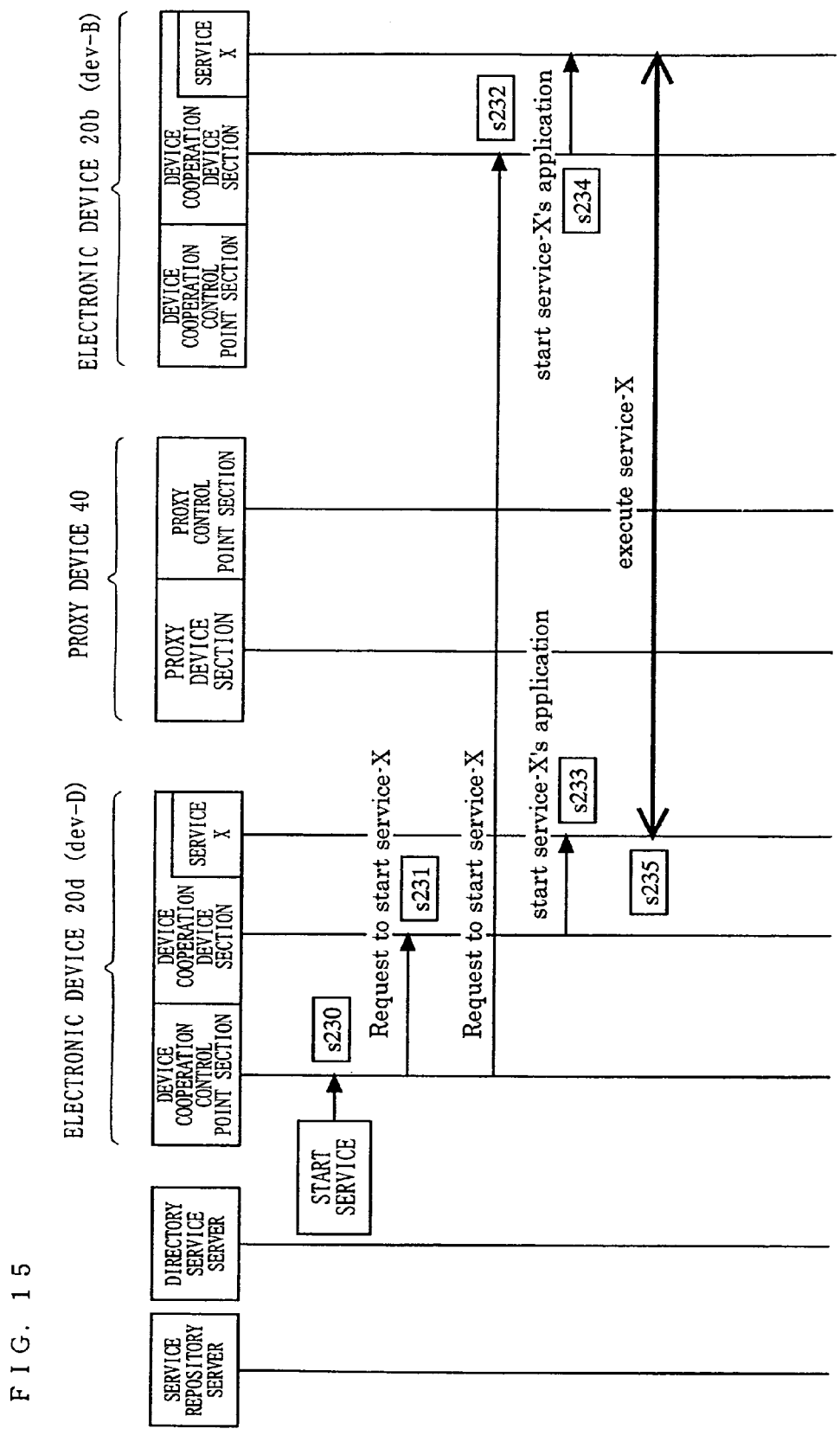
FIG. 15 is a flow chart showing process steps performed by the service execution device 20b according to the second embodiment.

Next, with reference to FIG. 14 and FIG. 15, a case where the device cooperation service operation performed in the device cooperation service system according to the second embodiment of the present invention is applied to a system supported by the UPnP network will be described. In the following example, as shown in FIG. 12, described is a case where three electronic devices 20a, 20b and 20c and the proxy device 40 are connected to the in-home network 30, the electronic device 20d is connected to the out-of-home network 50, the electronic device 20d acts as the service control device and the electronic device 20b acts as the service execution device, thereby executing the device cooperation service. Further, only the electronic device 20b is a device capable of executing the device cooperation service. FIG. 14 is a sequence diagram illustrating a process performed until an application is downloaded to the service control device 20d (dev-D) and the service execution device 20b (dev-B). FIG. 15 is a sequence diagram illustrating a process performed by the service control device 20d and the service execution device 20b after the application has been downloaded.

As shown in FIG. 14, the proxy device 40 performs the same processes as sequences s101 to s104, as shown in FIG. 10, which are performed between the local electronic devices (between the electronic devices 20 connected to each other via the router 10 and the network 30). That is, the proxy control point section 42 of the proxy device 40 is actuated by the user's instruction or a desired actuation instruction in the proxy device 40 (sequence s200). Addressing process is performed by the actuation, and an IP address is dynamically assigned to the proxy device 40 (not shown).

Next, a discovery process is to be performed. The control point section 42 of the proxy device 40 multicasts the SSDPM-SEARCH message to 239.255.255.250:1900 of all the electronic devices 20a, 20b and 20c connected to the router 10 (sequence s201). Each of the device cooperation device sections 22 of the electronic devices 20a, 20b, and 20c, which are connected to the network 30 and have received the message, sets a path to the description in a LOCATION header so as to unicast, to the proxy device 40, a response to the SSDP (sequence s202).

The proxy device 40 sends, based on the LOCATION header information, an instruction to the electronic device 20b so as to acquire the description from the electronic device 20b (for example, in the HTTP GET method). The electronic device 20b having received the instruction sends the description to the proxy device 40 (sequence s203). The proxy device 40 acquires the description form the electronic device 20b (sequences 204). Further, the proxy control point section 42 of the proxy device 40 accesses a control URL described in the device description acquired from the electronic device 20b, and requests the device cooperation device information of the electronic device 20b. The proxy device 40 acquires from the electronic device 20b the device cooperation device information in which described is the information relating to the device necessary for retrieving and executing the device cooperation service (sequence s205).

Through the process of sequences s200 to s205, the proxy device 40 can store the description and the device cooperation device information of the electronic device 20b (for example, stationary device, device type: DMR-E1200H).

In this state, the service control device 20d (for example, mobile telephone [device type: P507i]) utilizes a remote connection service provided by a service provider and the like, so as to complete the addressing and connect to the proxy device 40 via the networks 50 and 80 and the router 10. When the device cooperation control point section 23 of the service control device 20d is actuated (sequence s210), the description of the proxy device 40, and the description of the service execution device 20b acquired by the proxy device 40 are initially acquired (sequence s211). Further, the device cooperation control point section 23 of the service control device 20d acquires, from the proxy device section 41 of the proxy device 40, the device cooperation device information of the service execution device 20b defined as the device cooperation device based on the device description acquired in sequence s211 (sequence s212). As the protocol for acquiring a file, HTTP, SOAP and the like may be used.

As the UPnP discovery process (specifically, sequences s210 to s212), described is a method in which the out-of-home service control device 20d requests the description of the in-home service execution device 20b from the proxy device 40. However, the proxy device 40 may transfer, between the in-home electronic device and the out-of-home electronic device, the SSDP message which is from the electronic device and is used for discovery, that is, may function as a relay point for transmitting the information from the in-home electronic device to the out-of-home electronic device (or vice versa).

Next, when acquiring the device cooperation device information of the service execution device 20b, the device cooperation control point section 23 of the service control device 20d requests the directory service server 60 to provide the information relating to the device cooperation service executable between the device type of the service control device 20d: P507i and the device type of the service execution device 20b: DMR-E1200H, based on the device cooperation device information having been acquired. In response thereto, the directory service server 60 transmits the information relating to the relevant device cooperation service X to the service control device 20d (sequence s220). Here, when the plural device cooperation services are relevant, all the information relating thereto are acquired. The device cooperation control point section 23 of the service control device 20d specifies the device cooperation service X to be executed based on the acquired device cooperation service information relating to the service X and the device cooperation device information of the service execution device 20b which can execute the service X (sequence s221).

The service control device 20d may not directly make a request to the directory service server 60, and the service control device 20d may issue to the proxy device 40 an instruction for requesting the information of the device cooperation service from the directory service server 60, whereby the proxy device 40 may execute the process of sequence s220. In this case, other electronic devices 20 can acquire the device cooperation service information from the proxy device 40 without accessing the directory service server 60. When the proxy device 40 is caused to execute the process of sequence s220, the proxy device 40 may also execute the process of sequence s221.

Next, the service control device 20d requests the device cooperation device section 22 thereof to register the device cooperation service information having been acquired (sequence s222). In response to the request, the device cooperation device section 22 accesses the service repository server 70 and downloads the application relating to the device cooperation service X (sequence s223).

On the other hand, the service control device 20d requests the device cooperation device section 22 of the service execution device 20b to register the same device cooperation service information as acquired by the service control device 20d (sequence s224). In response to the request, the device cooperation device section 22 of the service execution device 20b accesses the service repository server 70 and downloads the application relating to the device cooperation service. (sequence s225).

Thus, when the application is previously downloaded, the download process is not required for actually executing the service, which is advantageous in that the process can be quickly started. Further, the processes of sequences s223 to s225 may be executed when the device cooperation service X is actually executed. Thereby, only when the service application relating to the device cooperation service is required, the application is downloaded, whereby resource can be prevented from being wasted in the case of no service being utilized.

As shown in FIG. 15, when a user using the service control device 20d requests the device cooperation service to be started (sequence s230), the device cooperation control point section 23 of the service control device 20d requests the device cooperation device sections 22 of the service control device 20d and the service execution device 20b to execute the device cooperation service X (sequences s231 and s232). In response thereto, the device cooperation device sections 22 of the service control device 20d and the service execution device 20b execute the application of the device cooperation service X having been downloaded (sequences s233 and s234).

As described above, the device cooperation service system according to the second embodiment of the present invention allows a user to easily retrieve the electronic device necessary for executing the device cooperation service, and to easily download a relevant application.

Third Embodiment

Figure 16:
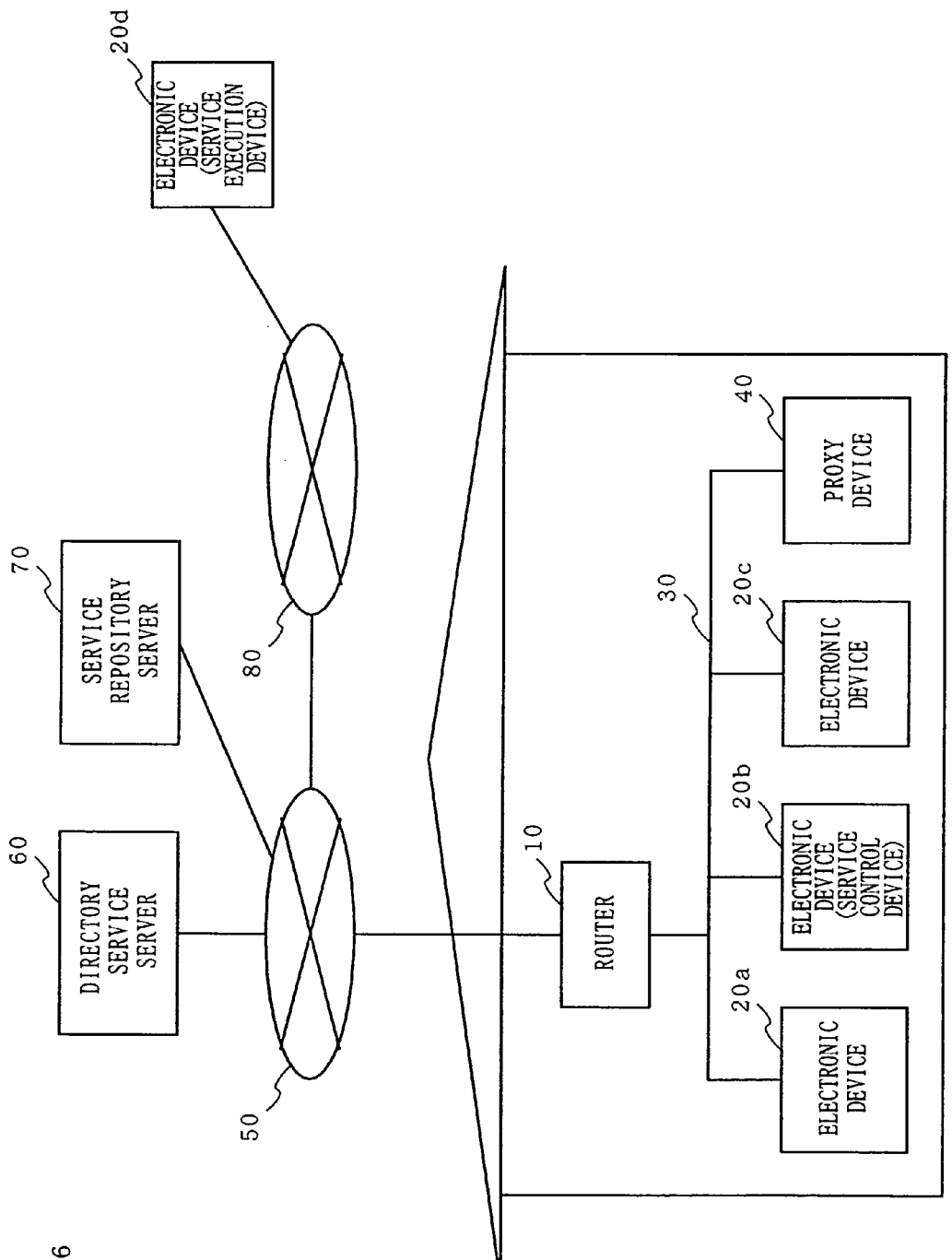
FIG. 16 is a diagram specifically illustrating an exemplary configuration of a device cooperation service system according to a third embodiment of the present invention.

FIG. 16 is a diagram illustrating an exemplary configuration of a device cooperation service system according to a third embodiment of the present invention. The device cooperation service system according to the third embodiment is the same as the aforementioned device cooperation service system according to the second embodiment except that the in-home electronic device acts as the service control device and the out-of-home electronic device acts as the service execution device in the third embodiment. Hereinafter, the third embodiment will be described focusing on the different portions. The components of the device cooperation service system according to the third embodiment which are the same as those of the device cooperation service systems according to the first and second embodiments are denoted by the same reference numerals and the description thereof is not given.

Figure 18:
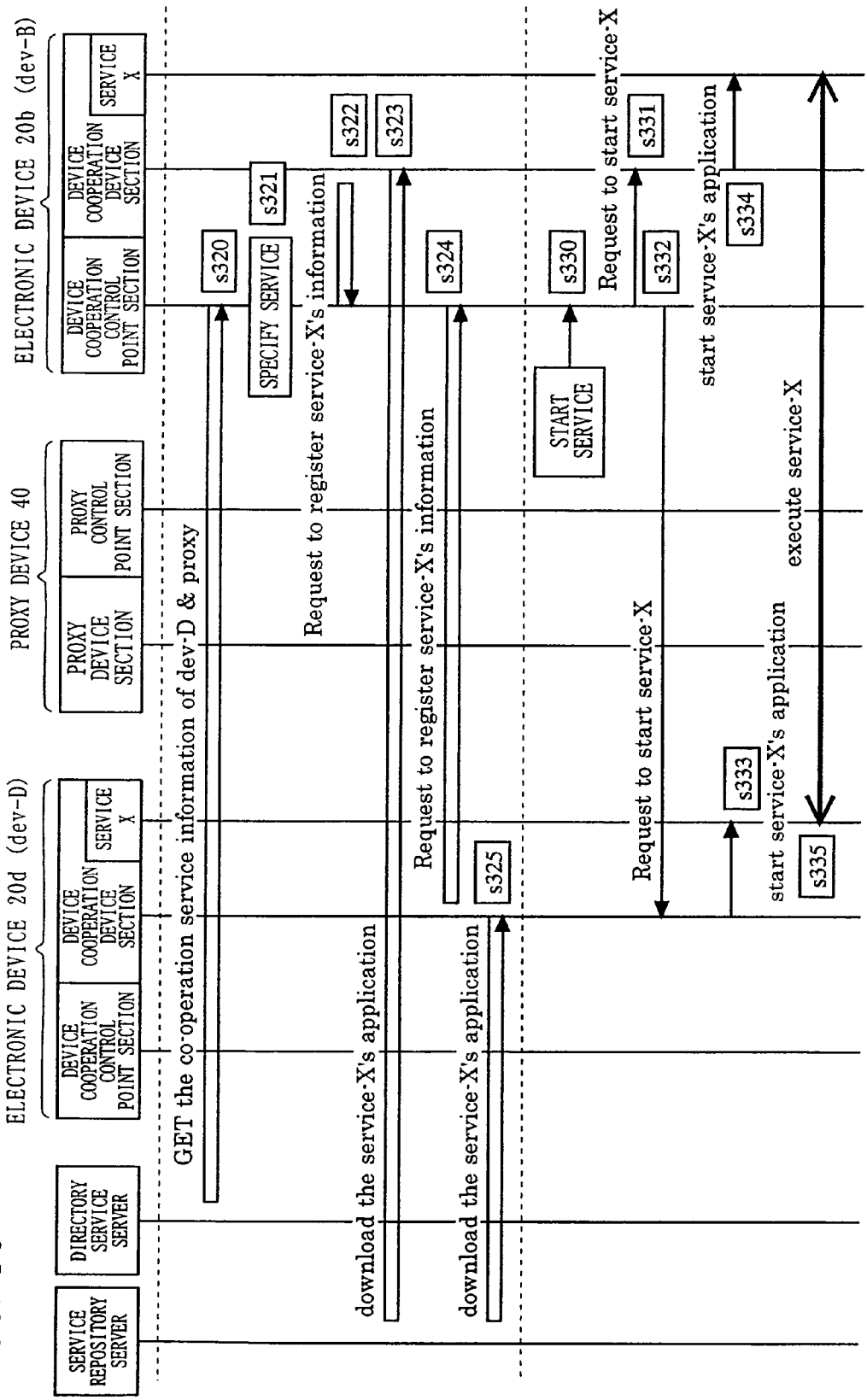
FIG. 18 is a flow chart showing process steps performed by the service execution device 20d according to the third embodiment.

FIG. 17 is a sequence diagram illustrating a process performed until an application is downloaded to the service control device 20d (dev-D) and the service execution device 20b (dev-B). FIG. 18 is a sequence diagram illustrating a process performed by the service control device 20d and the service execution device 20b after the application has been downloaded.

The proxy device 40 recognizes that the electronic device 20d is being connected thereto. In this case, the device cooperation control point section 23 of the electronic device 20d provides the proxy device section 41 of the proxy device 40 with the description of the electronic device 20d, thereby registering the presence of the electronic device 20d (sequence s301). The proxy device 40 caches (temporarily stores data for enhancing efficiency of data access) the acquired description of the electronic device 20d, and sends as a response the description cached in the proxy device 40 on behalf of the electronic device 20d when receiving the message of the discovery from another electronic device 20. Further, the proxy device 40 may transfer the acquired description of the electronic device 20d to the other electronic device 20 as an SSDP NOTIFY message so as to promote the discovery.

Here, when the device cooperation control point section 23 of the electronic device 20b is newly actuated (sequence s310), a discovery process is to be performed. The device cooperation control point section 23 of the electronic device 20b multicasts an M-SEARCH message to 239.255.255.250: 1900 (sequence s311).

The device cooperation device section of the proxy device 40 which is connected to the router 10 via the network 30 and has received the message sets, in a LOCATION header, a path to the description of each of the electronic device 20d connected externally from the home and the proxy device 40, so as to return a response (sequence s312). Here, when a plurality of the electronic devices are connected to the proxy device 40 externally from the home and the descriptions were registered in sequence s301, the paths to all the descriptions of the electronic devices 20 which are connected to the network 50 or 80 and are registered in the proxy device 40 are sent as responses.

When receiving the responses, the device cooperation control point section 23 of the electronic device 20b uses the HTTP GET method to acquire the descriptions of the electronic device 20d, the electronic device 20b and the proxy device 40 (sequences s313 and s314).

Next, the device cooperation control point section 23 of the electronic device 20b requests the proxy device 40 to acquire the device cooperation device information of the electronic device 20d defined as the device cooperation device among the electronic devices from which the device descriptions are acquired in sequence s314. The proxy device section 41 of the proxy device 40 having received the request transmits the device cooperation device information of the electronic device 20d being connected externally from the home and the device cooperation device information of the electronic device acting as both the device cooperation device and the proxy device 40 (sequence s315).

Next, the device cooperation control point section 23 of the electronic device 20b requests from the directory service server 60 the information of the device cooperation service executable between the device type of the electronic device 20d: P507i and the device type of the electronic device 20b: ADVC-100 based on the device cooperation device information having been acquired, so as to acquire the information relating to the relevant device cooperation service X (sequence s320). When the plural device cooperation services are relevant, all the information relating thereto are acquired. The device cooperation control point section 23 of the service control device 20b specifies the device cooperation service X to be executed, based on the device cooperation service information relating to the device cooperation service X having been acquired and the device cooperation device information of the service execution device 20d which can execute the service X (sequence s321).

Next, the service control device 20b requests the device cooperation device section 22 thereof to register the device cooperation service information having been acquired (sequence s322), and the device cooperation device section 22 having received the request accesses the service repository server 70 and downloads the application relating to the device cooperation service (sequence S323).

On the other hand, the service control device 20b requests the device cooperation device section 22 of the service execution device 20d to register the same device cooperation service information as acquired by the service control device 20b (sequence s324), and the device cooperation device section 22 of the service execution device 20d having received the request accesses the service repository server 70 and downloads the application relating to the device cooperation service (sequence s325).

Thus, when the application was previously downloaded, the download process is not required for actually executing the service, which is advantageous in that the process can be quickly started. Further, the processes of sequences s323 to s325 may be executed when the device cooperation service X is actually executed. Thereby, only when the service application relating to the device cooperation service is required, the application is downloaded, whereby resource can be prevented from being wasted in the case of no service being utilized.

As shown in FIG. 18, when a user using the service control device 20b requests the device cooperation service to be started (sequence s330), the device cooperation control point section 23 of the service control device 20b requests the device cooperation device sections 22 of the service control device 20b and the service execution device 20d to execute the device cooperation service X (sequences s331 and s332). In response thereto, the device cooperation device sections 22 of the service control device 20b and the service execution device 20d execute the application of the device cooperation service X having been downloaded (sequences s333 and s334).

As described above, the device cooperation service system according to the third embodiment of the present invention allows a user to easily find the electronic device necessary for executing the device cooperation service, and to easily download a relevant application.

INDUSTRIAL APPLICABILITY

The present invention is usable as, for example, a system having a plurality of electronic devices executing applications over a network, and is specifically usable when, for example, it is desired that the applications stored in the different electronic devices be executed over the network in cooperation with each other so as to realize a desired service.

The invention claimed is:

1. An electronic device for executing an application in cooperation with at least one other electronic device connected to a network and realizing a predetermined device cooperation service, the electronic device comprising:
a storage section for storing device information, concerning all other electronic devices connected to the network, which includes at least information used for identifying a device and information of executable device cooperation services;
an identification section for identifying the other electronic device which is operable to work in cooperation, based on the device information;
a service information acquisition section for requesting a predetermined server connected to the network to retrieve all device cooperation services executable in combination of the electronic device provided therewith and the other electronic device having been identified, and acquiring, from the predetermined server, service information containing the all device cooperation services executable having been retrieved;
an application acquisition section for specifying one of the all device cooperation services executable which are contained in the service information, and acquiring, from a predetermined server connected to the network, only an application necessary for executing the specified one of the all device cooperation services;
an acquisition requesting section for requesting the other electronic device having been identified to acquire, from the predetermined server, the service information containing the specified one of the all device cooperation services; and
a start requesting section for requesting the other electronic device having been identified to start the specified one of the all device cooperation services.

2. The electronic device according to claim 1, wherein the information used for identifying the device is device type data indicating a device type of an electronic device and the information of the executable device cooperation services is service type data indicating device cooperation services executable by the electronic devices.

3. The electronic device according to claim 2, wherein the identification section associates, for management, the service information acquired by the service information acquisition section with the device information of the other electronic device corresponding to the device type data having been specified by the service information acquisition section for retrieving the device cooperation service, thereby identifying the other electronic device which executes the device cooperation service.

4. The electronic device according to claim 1, wherein the service information is information having device type data associated with storage position data of an application necessary for executing the device cooperation service, the device type data being data indicating a device type of the electronic device which is operable to execute the device cooperation service.

5. The electronic device according to claim 4, wherein the application acquisition section acquires the application necessary for the device cooperation service with reference to the storage position data.

6. The electronic device according to claim 1, wherein the start requesting section further requests the other electronic device having been identified to acquire, from the predetermined server, a service application necessary for executing the device cooperation service and execute the service application.

7. A device cooperation service system for executing an application in cooperation with a plurality of electronic devices connected to a network and realizing a predetermined device cooperation service, the device cooperation service system comprising;
at least one control electronic device for controlling the device cooperation service;
at least one execution electronic device for executing the device cooperation service in cooperation with the at least one control electronic device;
a first server, connected to the network, for storing service information relating to the device cooperation service; and
a second server, connected to the network, for storing applications necessary for executing the device cooperation service, wherein
the control electronic device includes:
a storage section for storing device information, concerning all other electronic devices connected to the network, which includes at least information used for identifying a device and information of executable device cooperation services;
an identification section for identifying the execution electronic device which is operable to work in cooperation, based on the device information;
a service information acquisition section for requesting the first server to retrieve all device cooperation services executable in combination of the control electronic device provided therewith and the execution electronic device, and acquiring, from the first server, service information containing the all device cooperation services executable having been retrieved;
an application acquisition section for specifying one of the all device cooperation services executable which are contained in the service information, and acquiring, from the second server, only an application necessary for executing the specified one of the all device cooperation services;
an acquisition requesting section for requesting the execution electronic device to acquire, from the first server, the service information containing the specified one of the all device cooperation services; and
a start requesting section for requesting the execution electronic device to start the specified one of the all device cooperation services, and
the execution electronic device includes:
a service information acquisition section for acquiring, from the first server, service information relating to the device cooperation service to be executed in cooperation with the control electronic device, in response to the request from the control electronic device;
an application acquisition section for acquiring, for the second server, the application necessary for executing the device cooperation service indicated in the service information, and
an execution section for executing the acquired application.

8. The device cooperation service system according to claim 7, further comprising a proxy device for relaying data to be exchanged between an in-home electronic device connected to an in-home network and an out-of-home electronic device connected to an out-of-home network.

9. The device cooperation service system according to claim 8, wherein the proxy device acquires, from the out-of-home electronic device, device attribute information including the device information and distributes the acquired attribute information to the in-home electronic device.

10. The device cooperation service system according to claim 9, wherein the proxy device distributes the attribute information to the in-home electronic device using, as a trigger, the acquisition of the attribute information from the out-of-home electronic device.

11. The device cooperation service system according to claim 9, wherein the proxy device distributes the attribute information to the in-home electronic device using, as a trigger, a request of the attribute information received from the in-home electronic device.

12. The device cooperation service system according to claim 8, wherein the proxy device acquires device attribute information including the device information from the in-home electronic device and distributes the acquired attribute information to the out-of-home electronic device.

13. The device cooperation service system according to claim 12, wherein the proxy device distributes the attribute information to the out-of-home electronic device using, as a trigger, the acquisition of the attribute information from the in-home electronic device.

14. The device cooperation service system according to claim 12, wherein the proxy device distributes the attribute information to the out-of-home electronic device using, as a trigger, a request of the attribute information received from the out-of-home electronic device.

15. The device cooperation service system according to claim 8, wherein the information used for identifying the device is device type data indicating a device type of the electronic device, and the proxy device associates, for management, the acquired service information with the device information of the electronic device corresponding to the device type data having been specified for retrieving the device cooperation service, thereby identifying the electronic device which executes the device cooperation service.

* * * * *